United States Patent
Naik Raikar et al.

(10) Patent No.: US 10,365,885 B1
(45) Date of Patent: Jul. 30, 2019

(54) SYSTEMS AND METHODS FOR COMPOSITION OF AUDIO CONTENT FROM MULTI-OBJECT AUDIO

(71) Applicant: Sling Media Pvt. Ltd., Bangalore (IN)

(72) Inventors: Yatish Jayant Naik Raikar, Bangalore (IN); Mohammed Rasool, Bangalore (IN); Trinadha Harish Babu Pallapothu, Chirala (IN)

(73) Assignee: Sling Media Pvt. Ltd., Bangalore (IN)

( * ) Notice: Subject to any disclaimer, the term of this patent is extended or adjusted under 35 U.S.C. 154(b) by 0 days.

(21) Appl. No.: 15/901,703

(22) Filed: Feb. 21, 2018

(51) Int. Cl.
*G06F 3/16* (2006.01)
*G10L 25/51* (2013.01)

(52) U.S. Cl.
CPC .............. *G06F 3/165* (2013.01); *G10L 25/51* (2013.01)

(58) Field of Classification Search
CPC .............. G06F 3/165; G06F 17/30743; G06F 17/30769; G10L 25/87; G10L 25/18; G10L 25/51; H04N 5/45; G11B 27/28
USPC ........... 700/94; 704/246, 249, 500; 707/722, 707/769; 348/515; 84/625; 345/661; 381/22, 23, 300; 455/450; 705/14.52; 709/232; 715/202, 723; 725/1
See application file for complete search history.

(56) References Cited

U.S. PATENT DOCUMENTS

| | | | |
|---|---|---|---|
| 6,204,840 B1* | 3/2001 | Petelycky | G11B 27/034 375/E7.006 |
| 8,854,447 B2 | 10/2014 | Conness et al. | |
| 9,626,084 B2 | 4/2017 | Waggoner et al. | |
| 2002/0035723 A1* | 3/2002 | Inoue | H04N 21/23412 725/1 |
| 2002/0152117 A1* | 10/2002 | Cristofalo | G06Q 30/02 705/14.52 |
| 2003/0122862 A1* | 7/2003 | Takaku | H04N 21/23412 715/723 |
| 2005/0065976 A1* | 3/2005 | Holm | G06F 17/30743 |
| 2007/0005795 A1* | 1/2007 | Gonzalez | G11B 27/10 709/232 |
| 2007/0087756 A1* | 4/2007 | Hoffberg | G06Q 10/0631 455/450 |
| 2008/0041220 A1* | 2/2008 | Foust | G11B 27/031 84/625 |
| 2010/0332003 A1* | 12/2010 | Yaguez | G10L 15/22 700/94 |
| 2011/0013790 A1* | 1/2011 | Hilpert | G10L 19/008 381/300 |

(Continued)

OTHER PUBLICATIONS

Hoekstra et al., "Presentation Agents That Adapts to Users' Visual Interest and Follow Their Preferences," Proceedings of the 5th International Conference on Computer Vision System, 2007, 10 pages.

*Primary Examiner* — Gerald Gauthier
(74) *Attorney, Agent, or Firm* — Perkins Coie LLP (57) ABSTRACT

Embodiments are related to processing of one or more input audio feeds for generation of a target audio stream that includes at least one object of interest to a listener. In some embodiments, the target audio stream may exclusively or primarily include the sound of the object of interest to the listener, without including other persons. This allows a listener to focus on an object of his or her interest and not necessarily have to listen to the performances of other objects in the input audio feed. Some embodiments contemplate multiple audio feeds and/or with multiple objects of interest.

17 Claims, 9 Drawing Sheets

(56) References Cited

U.S. PATENT DOCUMENTS

| | | | |
|---|---|---|---|
| 2011/0082877 A1* | 4/2011 | Gupta | G10L 25/00 707/769 |
| 2012/0155653 A1* | 6/2012 | Jax | G10L 19/008 381/22 |
| 2013/0318071 A1* | 11/2013 | Cho | G06F 17/3074 707/722 |
| 2013/0345840 A1* | 12/2013 | Lempel | G06Q 30/0255 700/94 |
| 2014/0016787 A1* | 1/2014 | Neuendorf | G10L 19/008 381/23 |
| 2014/0032775 A1 | 1/2014 | Abiezzi et al. | |
| 2014/0195028 A1* | 7/2014 | Emerson, III | G06F 17/30386 700/94 |
| 2014/0330413 A1* | 11/2014 | Anniballi | G06F 17/30743 700/94 |
| 2015/0149173 A1* | 5/2015 | Korycki | H04M 3/563 704/246 |
| 2015/0172787 A1 | 6/2015 | Geramifard | |
| 2015/0193199 A1* | 7/2015 | Kim | G06F 3/165 700/94 |
| 2015/0215496 A1* | 7/2015 | Matsuo | H04N 5/04 348/515 |
| 2015/0269951 A1* | 9/2015 | Kalker | G10L 19/20 704/500 |
| 2015/0332667 A1* | 11/2015 | Mason | G10L 15/02 704/249 |
| 2016/0054903 A1* | 2/2016 | Jeong | H04N 5/2621 345/661 |
| 2016/0071546 A1 | 3/2016 | Neymotin et al. | |
| 2016/0247537 A1 | 8/2016 | Ricciardi | |
| 2016/0292266 A1* | 10/2016 | Mont-Reynaud | G06F 17/30743 |
| 2017/0109128 A1* | 4/2017 | Parvizi | G06F 3/165 |
| 2017/0199934 A1* | 7/2017 | Nongpiur | G06F 17/30769 |
| 2017/0244959 A1 | 8/2017 | Ranjeet et al. | |
| 2017/0309298 A1* | 10/2017 | Scott | G10L 25/87 |
| 2017/0329493 A1 | 11/2017 | Jia et al. | |
| 2017/0332036 A1* | 11/2017 | Panchaksharaiah | H04N 5/45 |
| 2018/0060428 A1* | 3/2018 | Lee | G10L 19/02 |
| 2018/0122403 A1* | 5/2018 | Koretzky | G10L 21/0272 |
| 2018/0341455 A1* | 11/2018 | Ivanov | G06F 3/165 |

* cited by examiner

SYSTEMS AND METHODS FOR COMPOSITION OF AUDIO CONTENT FROM MULTI-OBJECT AUDIO

BACKGROUND

A stream or a feed of audio content can be represented as a multitude of a large number of audio frames played in fast enough frequency so that the human ear can perceive that as continuous content. Each frame of an audio stream can have a set of samples. For example, when playing CD quality audio or uncompressed wave audio, around 44,100 frames per sample per second is played. If the audio content is mono, then a frame may have one sample. If the audio content is stereo, then the frame may have two samples, one sample for the left channel and one sample for the right channel. Thus, generally speaking, single- or multi-channel audio content can be represented by a multitude of successive frames. Each frame can be identified according to a unique timestamp that indicates a position of the frame with respect to the stream of audio content.

Audio content can have multiple objects, some of which can be animate such as sounds from humans, birds, animals, etc. Yet, some objects can be inanimate such as sounds of different musical instruments. In many applications, a listener may be interested in listening to a specific object of interest to a listener, among the multiple objects in the audio stream. For example, a mother listening to the audio recording of a music recital of her son's music school may be interested in listening only to her son's violin recital. As another example, a newly-married couple listening to an audio recording of the speeches given at their wedding reception may be interested in listening to the speech of a specific person, for instance the father of the bride. Further, there can be multiple audio feeds to choose from. For example, there can be multiple recordings of the evening's musical recital. Consequently, there is a need for systems and methods that identify an object of interest in an audio recording that includes multiple objects, and generate or compose an audio stream by focusing on the object of interest from one or more audio feeds.

SUMMARY

Disclosed embodiments are directed at systems, methods, and apparatus for dynamic composition of audio content. The method includes receiving at least one input audio feed including one or more objects included in multiple frames; generating a fingerprint of the at least one input audio feed; retrieving a fingerprint of the at least one object of interest to the listener; matching the fingerprint of the at least one input audio feed with the fingerprint of the at least one object of interest to detect matched frames that include the fingerprint of the at least one object of interest; and multiplexing the matched frames to generate a target audio stream having the at least one object of interest to the listener.

DETAILED DESCRIPTION OF THE DRAWINGS

The following detailed description of the invention is merely exemplary in nature and is not intended to limit the invention or the application and uses of the invention. Furthermore, there is no intention to be bound by any theory presented in the preceding background or the following detailed description.

The various embodiments described herein generally provide apparatus, systems and methods related to processing one or more input audio feeds for generation of a target audio stream using one or more input audio feeds and including one or more objects of interest. An input audio feed can include multiple objects. The object of interest to a listener can be one object in the multiple objects. In some embodiments, the target audio stream generated may exclusively or primarily include the sound of one object of interest to the listener, drowning or suppressing the sounds of the other objects in the input audio feed. For example, a mother may select only the violin as the object of interest in an audio recording of her son's musical recital without selecting the other instruments in the recital. This allows a person to focus on an object of his or her interest and not necessarily have to listen to the sounds of the other objects in the audio feed.

In some embodiments, the disclosed system can annotate a timeline of the input audio feed, indicating positions/frames where sounds from the object of interest is present, e.g., masking out other areas in the timeline. In the example of the mother selecting the violin as the object of interest, the disclosed system can generate a timeline of the musical recital such that only the portions in the timeline where the violin is played is shown illustratively with a certain color, such as green, whereas other portions of the timeline are shown as masked out/blurred out or displayed using some other color. The timeline can be overlaid on the input audio feed. In some embodiments, a target audio stream is also generated in addition to the timeline, the target audio stream including sounds of the object of interest.

In some embodiments, the disclosed system can generate a unified target audio stream (having a selected object of interest) using multiple audio feeds. In the example of the mother selecting the violin as the object of interest, the disclosed system can receive multiple recordings of the recital, e.g., from multiple parents. Using the multiple recordings (audio feeds), the disclosed system can generate a unified target audio stream having the violin as the only instrument. In some embodiments, for generating a target unified audio stream, the disclosed system can optimize over frames from different audio feeds. For example, over a certain portion of the recital, if the quality of the sound of the violin is determined to be better from audio feed 2 than audio feed 1, the disclosed system can select audio feed 2 for frames covering those portions of the recital.

The object in an audio feed input to the disclosed system can be any animate or inanimate object. Non-limiting examples of an audio feed can be personal recordings, shows, sports, movies, music, documentaries, streaming content from content providers such as APPLE MUSIC©, SPOTIFY©, HULU©, YOUTUBE©, HBO GO©, CNN©, ABC© etc. In some embodiments, the viewer can express an indication of an object of interest in the input audio feed(s) by inputting/providing a textual description, by uploading/ providing/submitting one or more audios of the object of interest, by identifying (based on an identifier such as a name, a role in an event, or an image) an object of interest from a plurality of objects displayed on a menu of a user interface, or by providing one or more audios including the object of interest.

For example, a newly-married bride may be interested in listening to the groom's comments throughout her wedding, i.e., an object of interest in an audio recording of their wedding program. The bride may provide/upload/submit an audio of her husband's voice to the disclosed system. The disclosed system receives the audio of the husband's voice and generates a fingerprint of the husband's voice. The system also generates a fingerprint of the audio recording of the wedding program. The system matches the fingerprint of the husband's voice with the fingerprint of the audio recording of the wedding program to detect matched frames that include the fingerprint of the husband's voice. The system multiplexes the matched frames to generate a target audio stream having the husband's voice.

In some implementations, the target audio stream is re-encoded at the same quality or a lower quality than the input audio feed. For example, the input audio feed can correspond to audio from a 4K video and a target audio stream may be of ultra high definition (UHD) audio, high definition (HD) audio, or standard definition (SD) quality audio. The input audio feed can be raw (unedited) footage recorded by a video camera, an over-the-air broadcast from a satellite or cable television distribution system, or any other audio feed. The input audio feed and/or the generated target audio stream may also be transferred over any type of communication network, such as the Internet or other wide area network, a local area network, a private network, a mobile communication system, a terrestrial television network, a cable television network, and a satellite television network. Additionally, the input audio feed and/or the target audio stream may be transmitted by way of any communication technology, such as by satellite, wire or optical cable, wireless, or other means. Further, the input audio feed and/or the target audio stream may be delivered by any transmission method, such as broadcast, multicast, simulcast, closed circuit, pay-per-view, on-demand, over-the-top (by "streaming," file transfer, or other means), or other methods. The input audio feed and/or the target audio stream could also be saved as a digital file in any computing device.

As one example environment, organizers of a conference with several keynote speakers back-to-back may operate the disclosed system to allow a listener to listen to an object of interest (e.g., a specific speaker) speaking at the conference. For example, the conference can have a publicly-accessible web portal of the speakers. The web portal can have an audio recording of the speeches at the conference and a menu displaying photos or names or roles of the speakers at the conference as selectable objects of interest. A person who is interested in speaker A can select speaker A as the object of interest. Consequently, the disclosed system can generate a target audio stream primarily or exclusively having the speech of speaker A. In some embodiments, the disclosed system can also provide the person an option to listen to the input audio feed.

The disclosed system is trained to identify the object(s) of interest from a training set of audio, using machine learning methodologies such as TENSORFLOW or BATVOX. In the example of the speakers at a conference, a training set can be a collection of audio clips of each speaker. During the training phase, the system generates fingerprints for the collection of audio clips in the training set. Based on the system getting trained using the training set of audio clips, the disclosed system is able to identify and extract frames that include the object of interest (e.g., speaker A), from an input audio feed of speeches of the speakers. A training set, for example, can be created for each object in an audio recording. In the context of a conference, there can be as many training sets as the number of speakers. Typically, the duration of an audio clip in the training set is less than the duration of the audio feed of the speeches.

In some embodiments, the training (e.g., generating the fingerprint) can be done prior, or subsequent, to receiving the input audio feed. In such embodiments, the fingerprint of an object is retrieved from a storage location or a database.

Embodiments of the disclosed system can be owned and operated by organizations (for profit or non-profit), schools, cable companies, broadcasting companies, or private individuals. Furthermore, in some embodiments, the disclosed system can generate a target audio stream on-the-fly. That is, the target audio stream can be generated contemporaneously while one or more input audio feeds are being received at the disclosed system. Thus, disclosed embodiments contemplate dynamic composition of the target audio stream using one or more input audio feeds and including one or more objects of interest.

FIGS. 1-4 illustrate representative environments of operation of the disclosed system for generating target audio streams having one or more objects of interest to a listener. With reference to FIGS. 1-4, P1, P2, P3, P4 are objects that may be present in different frames of an audio feed individually or in combination with one another. During a processing stage, the disclosed system may isolate frames to identify the object(s) included in a frame, e.g., using fingerprinting techniques. In the drawings and discussions herein, if multiple objects are included in a frame, these objects are denoted with a "+" sign. For example, if P1 and P2 are present in a frame, this is denoted as P1+P2.

Typical audio content can have multiple objects, some of which can be animate such as sounds from humans, birds, animals, etc. Yet, some objects of interest can be inanimate such as sounds of different musical instruments, machines, electronic devices, mechanical devices, vehicles, etc. In many applications, a listener may be interested in listening to a specific object of interest included among multiple objects in the audio stream.

Figure 1:
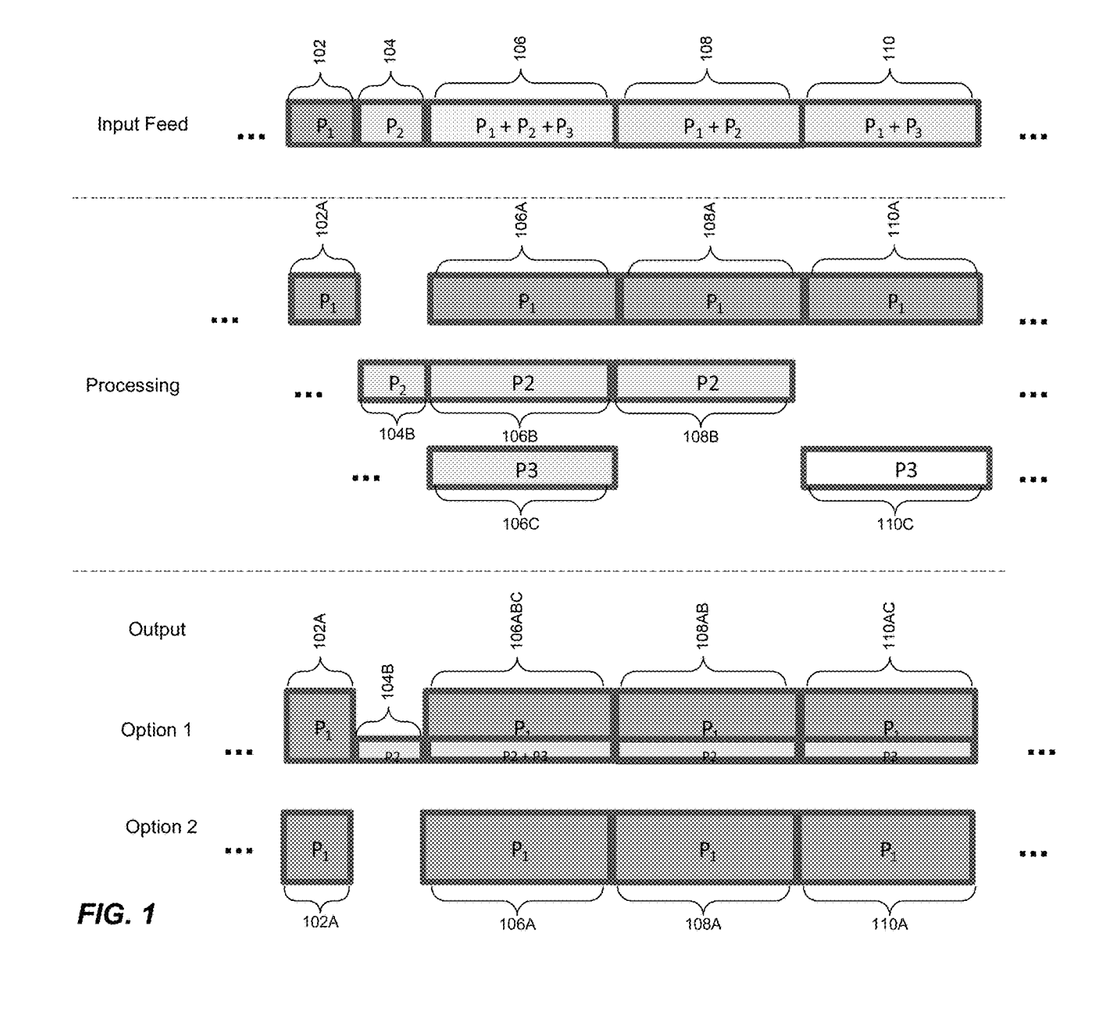
FIGS. 1-4 illustrate representative operations of the disclosed system for generating target audio stream(s) having one or more objects of interest to a listener, according to some embodiments of the disclosed technology.
Figure 2:
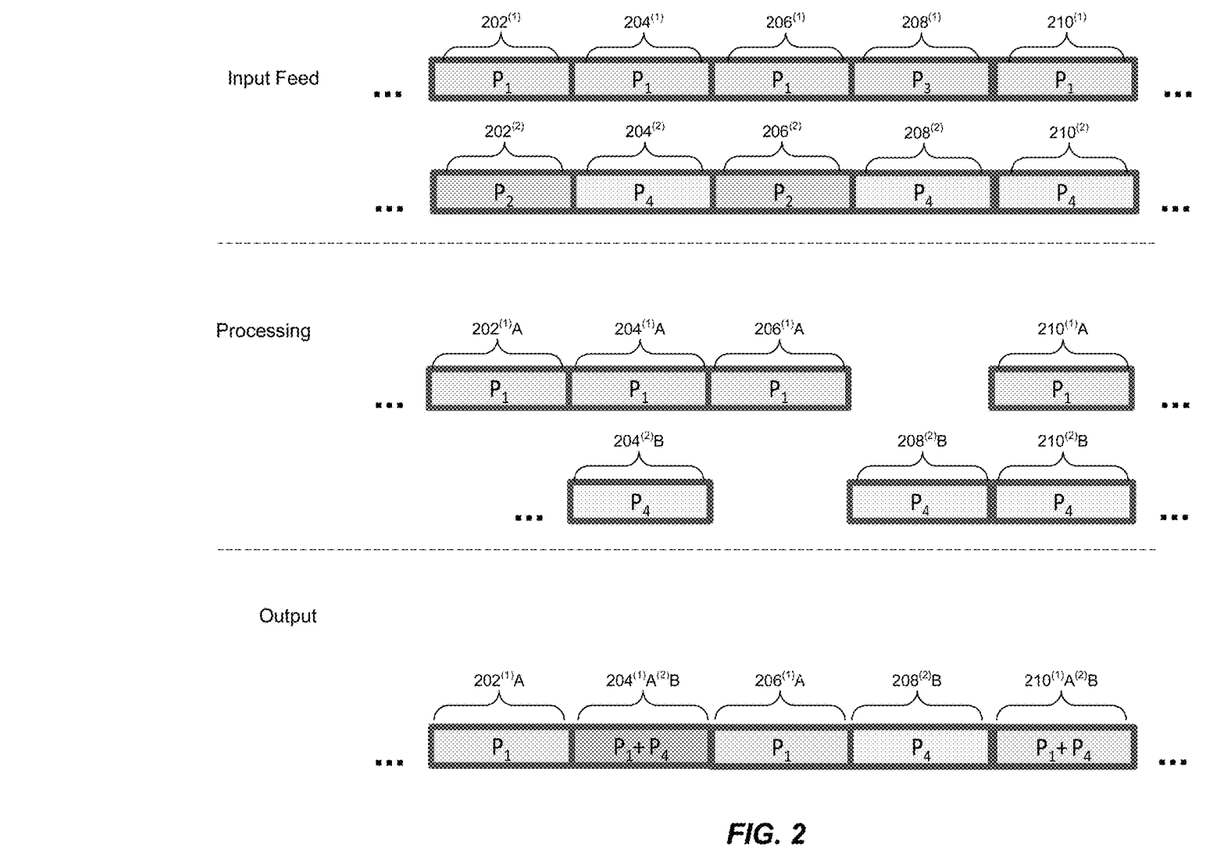

FIG. 1 shows a representative operation when a user chooses to generate a target audio stream including an object of interest to the listener from an input audio feed having multiple objects. The capital letters "A," "B" . . . used as part of the reference numerals to denote the audio frames denote the different objects that are isolated during processing. In the example shown in FIG. 1, the user selects P1 as the object of interest from an input audio feed that includes frames with objects P1, P2, P3. FIG. 1 shows an input feed (e.g., an audio recording) with frames 102, 104, 106, 108, 110 including objects P1, P2, P1+P2+P3,P1+P2,P1+P3 respectively. During processing of the input audio feed, the system identifies frames 102A, 106A, 108A, 110A as including object P1. The system also identifies the frames where objects P2 and P3 are included. According to disclosed embodiments, during the processing stage, the system can isolate the individual sounds from each object in a given frame. For example, the system can isolate frame 106 (that includes P1+P2+P3) into frames 106A, 106B, 106C including objects P1, P2, P3 respectively. In some embodiments, the target audio stream generated can have two output options. A first output option includes selecting the object of interest as the primary sound and partially drowning/suppressing the sounds of objects P2 and P3. A second output option includes exclusively selecting sounds of P1 as the only object in the target audio stream FIG. 2 shows a representative operation when a user chooses to generate a target audio stream including two objects of interest to the listener from two input audio feeds. In the example shown in FIG. 2, the user selects P1 and P4 as the objects of interest from two input audio feeds that includes frames with objects P1, P2, P3, P4. FIG. 2 shows input feed 1 with frames 202$^{(1)}$A, 204$^{(1)}$A, 206$^{(1)}$A, 208$^{(1)}$C, 210$^{(1)}$A including objects P1, P1, P1, P3, P1 respectively. FIG. 2 shows input feed 2 with frames 202$^{(2)}$B, 204$^{(2)}$D, 206$^{(2)}$B, 208$^{(2)}$D, 210$^{(2)}$D including objects P2, P4, P2, P4, P4 respectively. (The superscript notation on the frame reference numerals is used to denote whether a frame is included in feed 1 or feed 2. The capital letters "A," "B" . . . denote the different objects that are isolated during processing.) During processing of the input audio feed 1, the system identifies frames 202$^{(1)}$A, 204$^{(1)}$A, 206$^{(1)}$A, 210$^{(1)}$A as including object P1. During processing of the input audio feed 2, the system identifies frames 204$^{(2)}$D, 208$^{(2)}$D, 210$^{(2)}$D as including object P4. In some embodiments, the target audio stream generated includes frames 202$^{(1)}$A, 204$^{(1)}$A$^{(2)}$D, 206$^{(1)}$A, 208$^{(2)}$D, 210$^{(1)}$A$^{(2)}$D as including sounds of objects P1 and P4, either exclusively or in combination.

Figure 3:
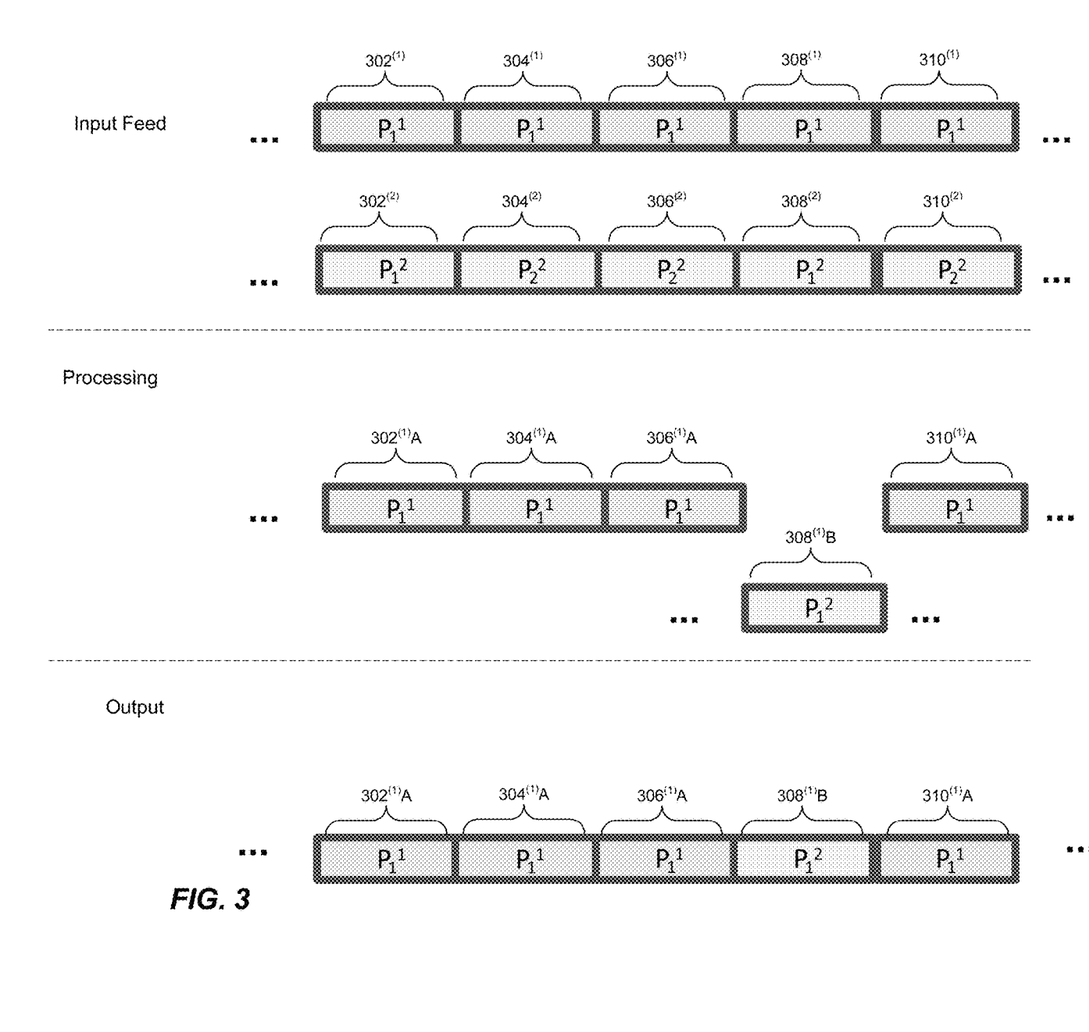

FIG. 3 shows a representative operation when a user chooses to generate a target audio stream including an object of interest to the listener from two input audio feeds, each feed at least having one object, with the target audio stream optimized over a quality of the input audio feeds. In the example shown in FIG. 3, the user selects P1 as the object of interest from the input audio feeds that includes frames with objects P1, P2. FIG. 3 shows input feed 1 with frames 302$^{(1)}$A, 304$^{(1)}$A, 306$^{(1)}$A, 308$^{(1)}$A, 310$^{(1)}$A including objects P1, P1, P1, P1, P1 respectively. FIG. 3 shows input feed 2 with frames 302$^{(2)}$A, 304$^{(2)}$B, 306$^{(2)}$B, 308$^{(2)}$A, 310$^{(2)}$B including objects P1, P2, P2, P1, P2 respectively. During processing of the input audio feed 1, the system identifies frames 302$^{(1)}$A, 304$^{(1)}$A, 306$^{(1)}$A, 310$^{(1)}$A as being of higher quality than their respective counterparts in input feed 2. During processing of the input audio feed 2, the system identifies frame 308$^{(2)}$A as being of higher quality than its respective counterparts in input feed 1. The target audio stream generated includes frames 302$^{(1)}$A, 304$^{(1)}$A, 306$^{(1)}$A, 308$^{(2)}$A, 310$^{(1)}$A as including sounds of object P1 optimized over an audio quality of the frames in the respective input audio feeds.

Figure 4:
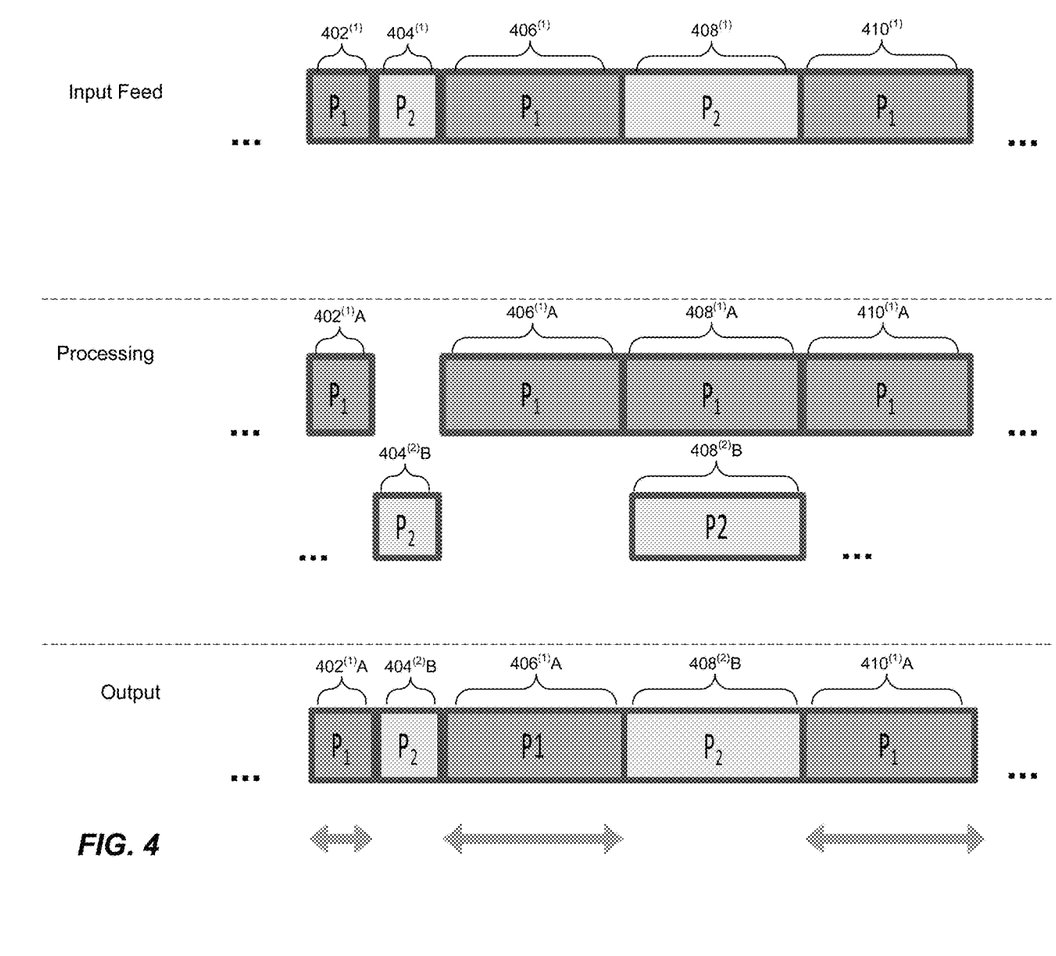

FIG. 4 shows a representative operation when a user chooses to generate a target audio stream (e.g., using one audio feed) including a timeline indicating positions when the sound of the object of interest to the listener is present. In the example shown in FIG. 4, the user selects P1 as the object of interest for which the timeline is generated. FIG. 4 shows an input feed with frames 402$^{(1)}$A, 404$^{(1)}$B, 406$^{(1)}$A, 408$^{(1)}$B, 410$^{(1)}$A including objects P1, P2, P1, P2, P1 respectively. During processing of the input audio feed, the system identifies frames 402$^{(1)}$A, 406$^{(1)}$A, 410$^{(1)}$A as having the object of interest P1. During processing of the input audio feed, the system also identifies frames 404$^{(1)}$B, 408$^{(1)}$B as having another object P2. As an output, a timeline (shown in double-sided arrows) is overlaid on the input audio feed indicating positions where sounds of object P1 are present. In some embodiments (not shown in FIG. 4), a target audio stream can be generated using frames 402$^{(1)}$A, 406$^{(1)}$A, 410$^{(1)}$A that include object of interest P1 exclusively.

The discussions in connection with FIGS. 1-4 are for explanation only. In alternate embodiments, no limitations are imposed on the number of objects, the number of objects of interest, or the number of input audio feeds. Further, in alternate embodiments, the disclosed methods can be suited to be applicable to other representative use-cases or environments of operations.

Figure 5:
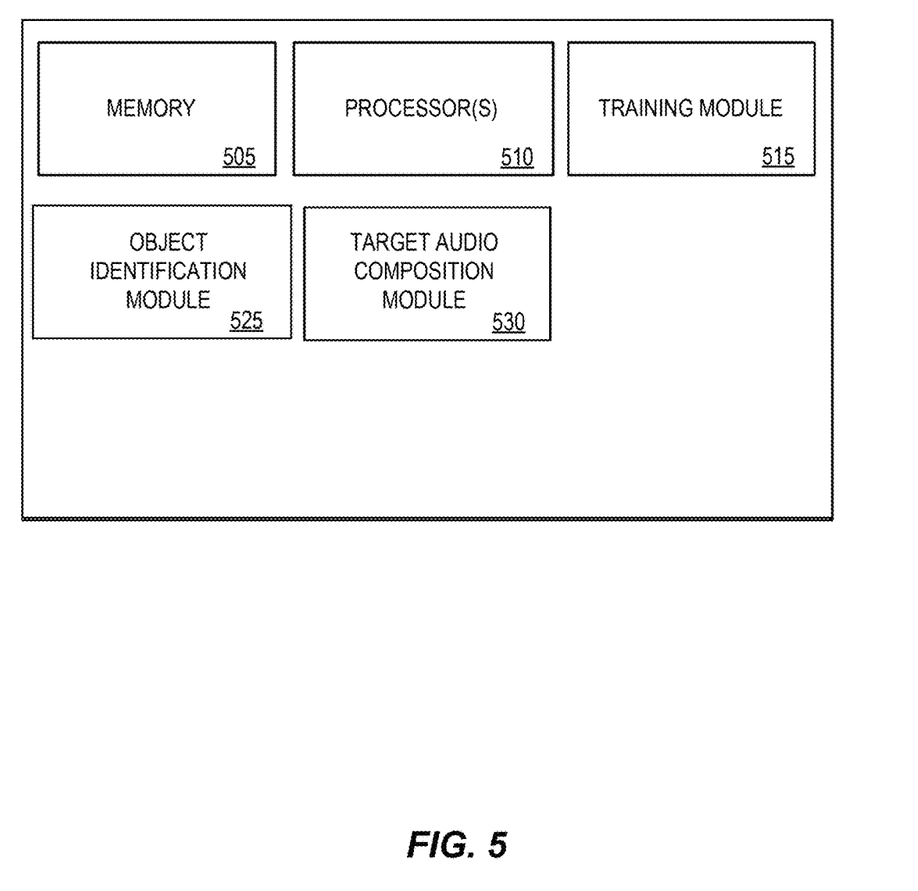
FIG. 5 illustrates an example architecture of a system for generating target audio stream(s) having one or more objects of interest to a listener, according to some embodiments of the disclosed technology.

FIG. 5 illustrates an example architecture of a system in accordance with disclosed embodiments for generating a target audio stream with one or more objects of interest to a listener. According to the embodiments shown in FIG. 5, the disclosed system (e.g., configured as one or more physical servers or cloud servers) can include memory 505, one or more processors 510, training module 515, object identification module 525, and target audio composition module 530. Other embodiments of the present invention may include some, all, or none of these modules and components, along with other modules, applications, and/or components. Still yet, some embodiments may incorporate two or more of these modules and components into a single module and/or associate a portion of the functionality of one or more of these modules with a different module.

Memory 505 can store instructions for running one or more applications or modules on processor(s) 510. For example, memory 505 could be used in one or more embodiments to house all or some of the instructions needed to execute the functionality of training module 515, object identification module 525, and target audio composition module 530. Generally, memory 505 can include any device, mechanism, or populated data structure used for storing information. In accordance with some embodiments of the present disclosure, memory 505 can encompass, but is not limited to, any type of volatile memory, nonvolatile memory, and dynamic memory. For example, memory 505 can be random access memory, memory storage devices, optical memory devices, magnetic media, floppy disks, magnetic tapes, hard drives, SIMMs, SDRAM, DIMMs, RDRAM, DDR RAM, SODIMMS, EPROMs, EEPROMs, compact discs, DVDs, and/or the like. In accordance with some embodiments, memory 505 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 505.

Training module 515 is configured to "learn" specific audio features associated with the objects from the one or more training content, during a training phase. Examples of specific audio features associated with an object of interest can be a pitch of the object of interest, a frequency of the object of interest, a dynamic frequency range of the object of interest, an amplitude of the object of interest, a dynamic audio range of the object of interest, or a cadence of the object of interest. Various other audio features can be associated with an object of interest. Training module 515 generates a fingerprint of each of the objects included in an input audio feed.

Object identification module 525 is configured to identify frames that include the object of interest, based on a match between a fingerprint of the object of interest and a fingerprint of the input audio feed to detect "matched" frames.

Target audio composition module 530 is configured to generate the target audio streams by multiplexing the matched frames identified by object identification module 525. Further examples can include removal of the audio streams of non-interested objects or suppression of the audio streams of non-interested objects.

The functionality of the modules discussed in connection with FIG. 5 can be similarly applicable in embodiments with multiple audio feeds or multiple objects of interest. In these embodiments, the disclosed system generates fingerprints for each input audio feed and each object of interest. The system matches the fingerprint for each object of interest with the fingerprint of each input audio feed.

Alternate embodiments of the disclosed system may have any number of modules and functionalities of the modules can be combined or divided in any suitable manner.

Figure 6A:
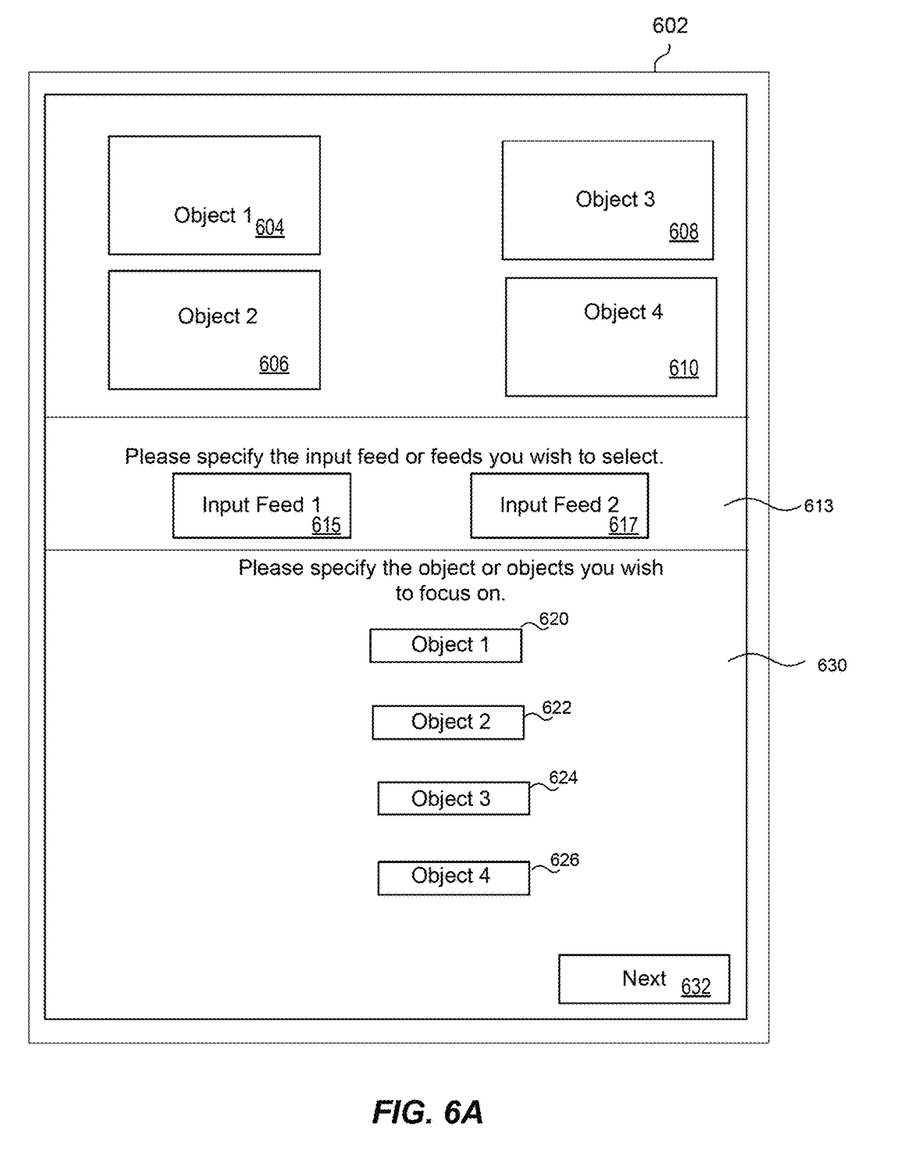
FIGS. 6A-6C illustrate example snapshots of user interfaces in accordance with disclosed embodiments for generating target audio stream(s) having one or more objects of interest to a listener, according to some embodiments of the disclosed technology.
Figure 6B:
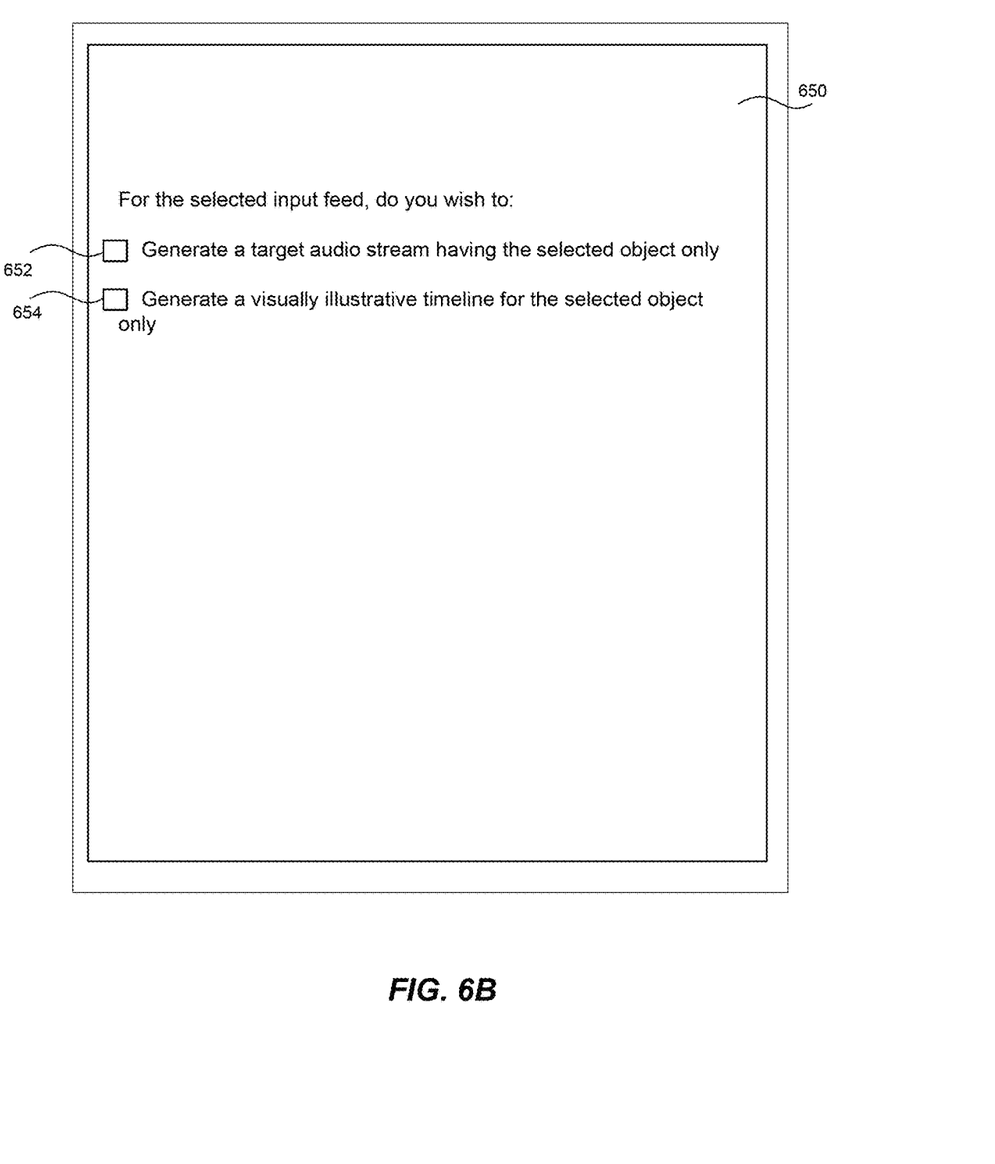
Figure 6C:
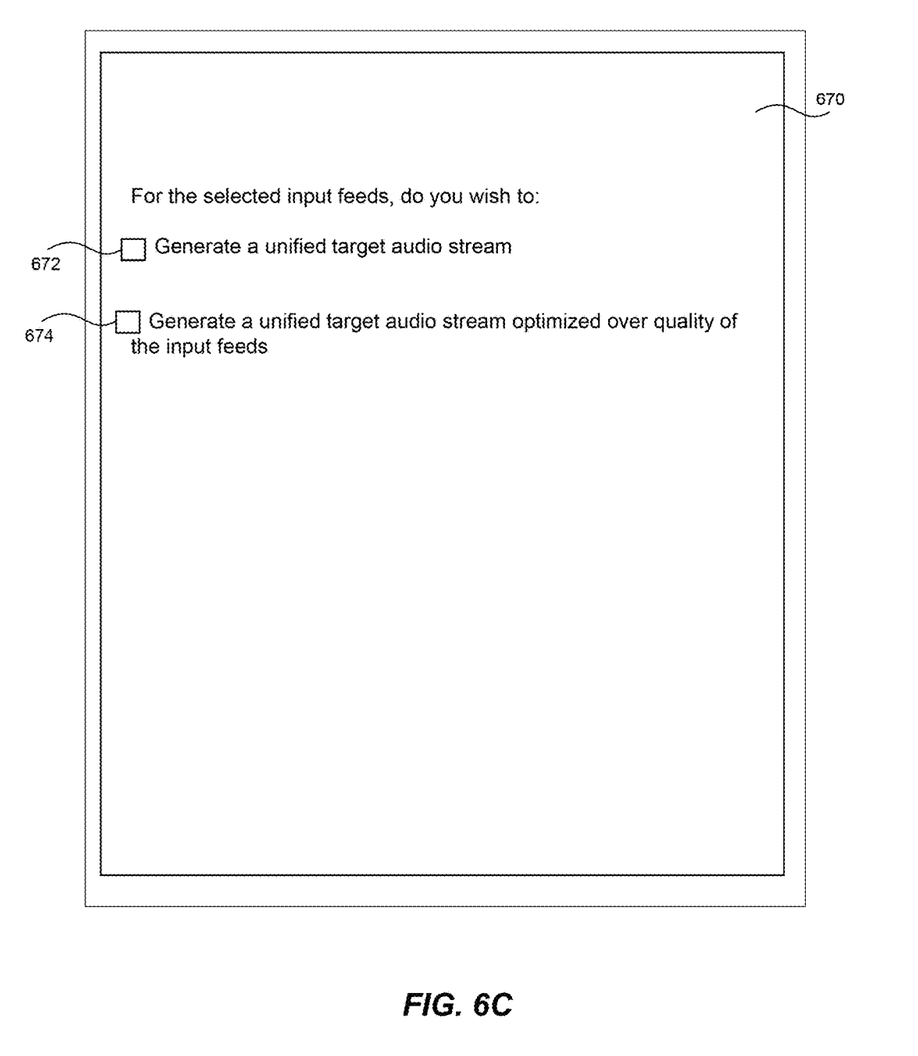

FIGS. 6A-6C illustrate example snapshots of user interfaces in accordance with disclosed embodiments for generating a target audio stream having one or more objects of interest to a listener. The user interface can be displayed on a monitor such as a mobile device monitor, a computer monitor, or a TV monitor. The user interface can be displayed by a remote web portal (e.g., of a conference or of a music school or of a streaming content provider) or electronic programing content (e.g., a podcast, a talk show). Thus, a person can interact with the user interface by clicking a button, hovering a mouse, or giving a voice command to a voice control system such as GOOGLE© ASSISTANT© or AMAZON© ALEXA©, or any type of suitable input device operative to interact with the user interface.

The snapshot 602 shows four objects, object 1, object 2, object 3, object 4 denoted as 604, 606, 608, 610 respectively. The objects can be shown by images such as images of persons or musical instruments. The objects can also be identified by their names, roles, or positions in an event, a family, or an organization. Region 613 shows options for selecting one or multiple audio feeds as input. For example, a user can select input audio feed 1 by clicking on button 615 and/or input audio feed 2 by clicking on button 617. Embodiments of the disclosed system allow for selection of one or multiple input audio feeds. Region 630 shows options for selecting (from object 1, object 2, object 3, object 4), an object as an object of interest or multiple objects as objects of interest.

Region 630 of snapshot 602 includes a message/notification region in which the user interface queries the viewer whether the viewer wishes to focus on object 1, object 2, object 3, and/or object 4. A user can specify a selection of his or her object of interest by clicking on any of buttons 620, 622, 624, or 626. After selecting one or more objects and one or more input feeds, a user clicks on next button 632. Depending on whether the user clicked on a single audio feed or multiple audio feeds in snapshot 602, snapshot 602 refreshes into snapshot 650 (FIG. 6B) or snapshot 670 (FIG. 6C).

FIG. 6B is a snapshot showing a user interface when a user selects one input audio feed and one or more objects of interest. Snapshot 650 displays selection options 652 and 654. Option 652 queries whether the user wishes to generate a target audio stream with the selected object(s) of interest. Option 654 queries whether the user wishes to generate a visually illustrative timeline (e.g., overlaid on the input audio feed) with indicia showing positions where sounds from the user-selected object(s) is/are present.

FIG. 6C is a snapshot showing a user interface when a user selects multiple input audio feeds and one or more objects of interest. Snapshot 670 displays selection options 672 and 674. Option 672 queries whether the user wishes to generate a unified (e.g., using the multiple audio feeds) target audio stream with the one or more objects of interest. Option 674 queries whether the user wishes to generate a unified (e.g., using the multiple audio feeds) target audio stream with the one or more objects of interest, the unified target stream being optimized over audio quality of the input audio feeds.

In alternate embodiments, various other features and functionalities can be displayed by user interfaces associated with the disclosed system. Thus, the disclosed system is not necessarily limited to the user interfaces shown in FIG. 6A-6C.

Figure 7:
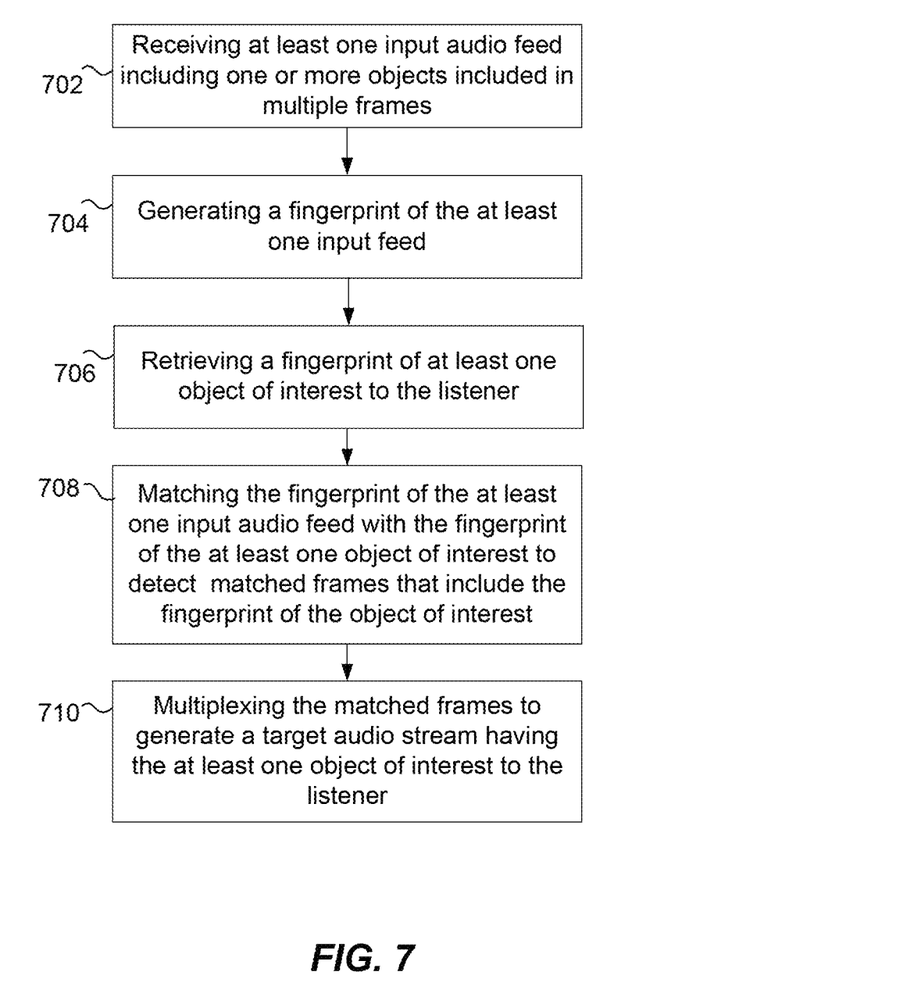
FIG. 7 illustrates a flow diagram showing a process associated with generating a target audio stream having one or more objects of interest to a listener, according to some embodiments of the disclosed technology.

FIG. 7 illustrates a flow diagram showing a process associated with generating a target audio stream having one or more objects of interest to a listener. At step 702, the process receives at least one input audio feed including one or more objects included in multiple frames. At step 704, the process generates a fingerprint of the at least one input audio feed. At step 706, the process retrieves a fingerprint of the at least one object of interest to the listener. At step 708, the process matches the fingerprint of the at least one input audio feed with the fingerprint of the at least one object of interest to detect matched frames that include the fingerprint of the at least one object of interest. In some embodiments, the matching results in sounds from the at least one object of interest to the listener to appear in the target audio stream. In some embodiments, the matching causes complete or partial elimination (from the target audio stream) of objects that do not correspond to the at least one object of interest to the listener. At step 710, the process multiplexes the matched frames to generate a target audio stream having the at least one object of interest to the listener.

In some embodiments, a listener may be interested in two objects of interest, e.g., a first object of interest and a second object of interest. In these embodiments, the process generates a fingerprint of the first object of interest and a second object of interest and matches the fingerprint of the at least one input audio feed respectively with: (i) the fingerprint of the first object of interest and (ii) the fingerprint of the second object of interest to detect matched frames that include the fingerprint of the first object of interest or the second object of interest. The process multiplexes the matched frames to generate the target audio stream. In some embodiments, the first object of interest or the second object of interest to be present in the same or different frames.

In some embodiments, the input feed can include a first feed and a second feed. In these embodiments, the matched frames include a first set of matched frames (e.g., obtained from matching a fingerprint of the first feed with the fingerprint of the object of interest) and a second set of matched frames (e.g., obtained from matching a fingerprint of the second feed with the fingerprint of the object of interest). Upon detecting a frame in the first set of matched frames has a higher audio quality relative to a corresponding frame in the second set of matched frames, the process selects the (higher quality audio) frame in the first set of matched frames. The process generates the target audio stream including the frame in the first set of matched frames.

In some embodiments, the process creates a timeline of the input audio feed. The process can annotate the timeline of the input audio feed at positions corresponding to positions of the matched frames. In some embodiments, the annotating allows playing of the target audio stream at the positions of the matched frames. In some embodiments, the annotating allows selective seeking of the positions of the matched frames, without generation of the target audio stream. For example, a listener can easily seek/locate positions of the matched frames where sounds of the object of interest are present in the input audio feed(s).

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media may include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments may be implemented as devices or modules using hardware circuits, software, or combinations thereof. For example, a hardware circuit implementation may include discrete analog and/or digital components that are, for example, integrated as part of a printed circuit board. Alternatively, or additionally, the disclosed components or modules may be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols. For example, the communications can include any combination of local area and/or wide area networks, using wired and/or wireless communication systems. The networks could use any or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols may include multiprotocol label switching (MPLS), transmission control protocol/Internet protocol (TCP/IP), User Datagram Protocol (UDP), hypertext transport protocol (HTTP), simple mail transfer protocol (SMTP), and file transfer protocol (FTP). Data exchanged over the one or more networks may be represented using technologies, languages, and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method for composition of audio content comprising:
   receiving an input audio feed including one or more objects distributed in multiple frames, wherein an object of interest in the one or more objects is identifiable based on a unique characteristic;
   generating a fingerprint of at least a portion of the input audio feed;
   retrieving, from a database, a fingerprint of the object of interest;
   comparing the fingerprint of at least the portion of the input audio feed with the fingerprint of the object of interest to detect matched frames that include the fingerprint of the object of interest;
   compositing the matched frames to generate a target audio stream having the object of interest; and
   wherein the one or more objects distributed in multiple frames further includes a first object of interest and a second object of interest, further comprising:
      generating a fingerprint of the first object of interest and a fingerprint of the second object of interest; and
      comparing the fingerprint of at least the portion of the input audio feed respectively with:
         (i) the fingerprint of the first object of interest, and
         (ii) the fingerprint of the second object of interest to detect matched frames that include the fingerprint of the first object of interest or the fingerprint of the second object of interest; and
      compositing the matched frames to generate the target audio stream having the first object of interest or the second object of interest to be present in common or different frames.

2. The method of claim 1, wherein comparing the fingerprint of at least the portion of the input audio feed with the fingerprint of the object of interest is associated with partial elimination of objects that do not correspond to the object of interest, from the target audio stream.

3. The method of claim 1, wherein comparing the fingerprint of at least the portion of the input audio feed with the fingerprint of the object of interest is associated with complete elimination of objects that do not correspond to the object of interest, from the target audio stream.

4. The method of claim 1, further comprising:
   creating a timeline of the input audio feed; and
   annotating the timeline of the input audio feed at positions corresponding to positions of the matched frames.

5. The method of claim 4, wherein the annotating allows playing of the target audio stream at the positions of the matched frames.

6. The method of claim 4, wherein the annotating allows selective seeking the positions of the matched frames, without generation of the target audio stream.

7. A non-transitory computer-readable storage medium storing instructions configured for composition of audio content to perform a method comprising:
   receiving an input audio feed including one or more objects distributed in multiple frames, wherein an object of interest in the one or more objects is identifiable based on a unique characteristic;
   generating a fingerprint of at least a portion of the input audio feed;
   retrieving, from a database, a fingerprint of the object of interest;
   comparing the fingerprint of at least the portion of the input audio feed with the fingerprint of the object of interest to detect matched frames that include the fingerprint of the object of interest;
   compositing the matched frames to generate a target audio stream having the object of interest; and
   wherein the one or more objects distributed in multiple frames includes a first object of interest and a second object of interest, further comprising:
      generating a fingerprint of the first object of interest and a fingerprint of the second object of interest; and
      comparing the fingerprint of at least the portion of the input audio feed respectively with:
         (i) the fingerprint of the first object of interest and
         (ii) the fingerprint of the second object of interest to detect matched frames that include the fingerprint of the first object of interest or the fingerprint of the second object of interest; and
      compositing the matched frames to generate the target audio stream having the first object of interest or the second object of interest to be present in common or different frames.

8. The computer-readable storage medium of claim 7, wherein comparing the fingerprint of at least the portion of the input audio feed with the fingerprint of the object of interest is associated with partial elimination of objects that do not correspond to the object of interest, from the target audio stream.

9. The computer-readable storage medium of claim 7, wherein comparing the fingerprint of at least the portion of the input audio feed with the fingerprint of the object of interest is associated with complete elimination of objects that do not correspond to the object of interest, from the target audio stream.

10. The computer-readable storage medium of claim 7, the method further comprising:
    creating a timeline of the input audio feed;
    annotating the timeline of the input audio feed at positions corresponding to positions of the matched frames.

11. An apparatus for composition of audio content comprising:
    a memory;
    one or more processors electronically coupled to the memory and configured for:
       receiving an input audio feed including one or more objects distributed in multiple frames, wherein an object of interest in the one or more objects is identifiable based on a unique characteristic;
       generating a fingerprint of at least a portion of the input audio feed;
       retrieving, from a database, a fingerprint of the object of interest;
       comparing the fingerprint of at least the portion of the input audio feed with the fingerprint of the object of interest to detect matched frames that include the fingerprint of the object of interest;
       compositing the matched frames to generate a target audio stream having the object of interest; and
       wherein the one or more objects distributed in multiple frames includes a first object of interest and a second object of interest, further comprising:
          generating a fingerprint of the first object of interest and a fingerprint of the second object of interest; and
          comparing the fingerprint of at least the portion of the input audio feed respectively with:
             (i) the fingerprint of the first object of interest and
             (ii) the fingerprint of the second object of interest to detect matched frames that include the fingerprint of the first object of interest or the fingerprint of the second object of interest; and
          compositing the matched frames to generate the target audio stream having the first object of interest or the second object of interest to be present in common or different frames.

12. The apparatus of claim 11, wherein comparing the fingerprint of at least the portion of the input audio feed with the fingerprint of the object of interest is associated with partial elimination of objects that do not correspond to the object of interest, from the target audio stream.

13. The apparatus of claim 11, wherein comparing the fingerprint of at least the portion of the input audio feed with the fingerprint of the object of interest is associated with complete elimination of objects that do not correspond to the object of interest, from the target audio stream.

14. The apparatus of claim 11, wherein the one or more processors are further configured for:
    creating a timeline of the input audio feed; and
    annotating the timeline of the input audio feed at positions corresponding to positions of the matched frames.

15. A method for composition of audio content comprising:
    receiving an input audio feed including one or more objects distributed in multiple frames, wherein an object of interest in the one or more objects is identifiable based on a unique characteristic;
    generating a fingerprint of at least a portion of the input audio feed;
    retrieving, from a database, a fingerprint of the object of interest;
    comparing the fingerprint of at least the portion of the input audio feed with the fingerprint of the object of interest to detect matched frames that include the fingerprint of the object of interest; and
    compositing the matched frames to generate a target audio stream having the object of interest; and
    wherein the input audio feed includes a first feed and a second feed, wherein the matched frames include a first set of matched frames and a second set of matched frames, further comprising:
       generating a fingerprint of the first feed and a fingerprint of the second feed;
       comparing the fingerprint of the object of interest with the fingerprint of the first feed to detect a first set of matched frames;
       comparing the fingerprint of the object of interest with the fingerprint of the second feed to detect a second set of matched frames;

upon detecting a frame in the first set of matched frames has a higher audio quality relative to a corresponding frame in the second set of matched frames, selecting the frame in the first set of matched frames; and generating the target audio stream having the object of interest, wherein the target audio stream includes the frame in the first set of matched frames.

16. A non-transitory computer-readable storage medium storing instructions configured for composition of audio content to perform a method comprising:

receiving an input audio feed including one or more objects distributed in multiple frames, wherein an object of interest in the one or more objects is identifiable based on a unique characteristic;

generating a fingerprint of at least a portion of the input audio feed;

retrieving, from a database, a fingerprint of the object of interest;

comparing the fingerprint of at least the portion of the input audio feed with the fingerprint of the object of interest to detect matched frames that include the fingerprint of the object of interest; and compositing the matched frames to generate a target audio stream having the object of interest; and wherein the input audio feed includes a first feed and a second feed, wherein the matched frames include a first set of matched frames and a second set of matched frames, further comprising:

generating a fingerprint of the first feed and a fingerprint of the second feed;

comparing the fingerprint of the object of interest with the fingerprint of the first feed to detect a first set of matched frames; and comparing the fingerprint of the object of interest with the fingerprint of the second feed to detect a second set of matched frames;

upon detecting a frame in the first set of matched frames has a higher audio quality relative to a corresponding frame in the second set of matched frames, selecting the frame in the first set of matched frames; and generating the target audio stream having the object of interest, wherein the target audio stream includes the frame in the first set of matched frames.

17. An apparatus for composition of audio content comprising:

a memory;

one or more processors electronically coupled to the memory and configured for:

receiving an input audio feed including one or more objects distributed in multiple frames, wherein an object of interest in the one or more objects is identifiable based on a unique characteristic;

generating a fingerprint of at least a portion of the input audio feed;

retrieving, from a database, a fingerprint of the object of interest;

comparing the fingerprint of at least the portion of the input audio feed with the fingerprint of the object of interest to detect matched frames that include the fingerprint of the object of interest;

compositing the matched frames to generate a target audio stream having the object of interest; and wherein the input audio feed includes a first feed and a second feed, wherein the matched frames include a first set of matched frames and a second set of matched frames, further comprising:

generating a fingerprint of the first feed and a fingerprint of the second feed;

comparing the fingerprint of the object of interest with the fingerprint of the first feed to detect a first set of matched frames; and comparing the fingerprint of the object of interest with the fingerprint of the second feed to detect a second set of matched frames;

upon detecting a frame in the first set of matched frames has a higher audio quality relative to a corresponding frame in the second set of matched frames, selecting the frame in the first set of matched frames; and generating the target audio stream having the object of interest, wherein the target audio stream includes the frame in the first set of matched frames.

\* \* \* \* \*